United States Patent [19]

Harris et al.

[11] Patent Number: 5,632,412
[45] Date of Patent: May 27, 1997

[54] VALVE ASSEMBLY AND METHOD FOR DISPENSING GELATINOUS MATERIALS

[75] Inventors: Clark E. Harris, Fairport; Berle A. Dale, Rochester; Richard M. Fraczek, Brockport; Karen L. Pond, Pittsford, all of N.Y.

[73] Assignee: Eastman Kodak Company, Rochester, N.Y.

[21] Appl. No.: 432,394

[22] Filed: May 1, 1995

[51] Int. Cl.$^6$ .................................................. B65D 35/30
[52] U.S. Cl. ................. 222/1; 222/493; 222/571; 222/387; 222/389
[58] Field of Search ................... 222/387, 389, 222/491–496, 571, 1; 137/535, 537

[56] References Cited

U.S. PATENT DOCUMENTS

| | | | |
|---|---|---|---|
| 1,911,616 | 5/1933 | Gruber | 222/493 X |
| 1,983,820 | 12/1934 | Shugart et al. | 222/493 X |
| 2,002,723 | 5/1935 | Voke et al. | 222/493 |
| 2,596,909 | 5/1952 | Mufich et al. | |
| 2,640,630 | 6/1953 | Genco | |
| 2,711,271 | 6/1955 | Schlicksupp | 222/493 |
| 3,076,583 | 2/1963 | Eberspacher | 222/493 |
| 3,102,691 | 9/1963 | Gall | 239/539 X |
| 3,815,787 | 6/1974 | Spies | 222/492 X |
| 4,363,429 | 12/1982 | Schindler | 222/571 X |
| 4,376,498 | 3/1983 | Davis | |
| 4,462,436 | 7/1984 | Rangwala | 222/493 X |
| 4,721,129 | 1/1988 | Sousa | 137/508 |
| 4,809,816 | 3/1989 | Kinack et al. | 222/493 X |
| 4,840,313 | 6/1989 | Hansen | 239/456 |
| 5,058,769 | 10/1991 | Kurtz | |
| 5,064,098 | 11/1991 | Hutter et al. | |
| 5,188,289 | 2/1993 | Pesho | |
| 5,193,593 | 3/1993 | Denis et al. | 222/571 X |

FOREIGN PATENT DOCUMENTS

| | | |
|---|---|---|
| 220027 | 4/1987 | European Pat. Off. |
| 418957 | 3/1991 | European Pat. Off. |
| 785809 | 8/1935 | France |
| 504885 | 5/1939 | United Kingdom ................. 222/493 |
| 658443 | 10/1951 | United Kingdom |

*Primary Examiner*—Kevin P. Shaver
*Attorney, Agent, or Firm*—Susan L. Parulski

[57] ABSTRACT

A valve assembly for dispensing a measured quantity of a gelatinous semisolid material into a receptacle comprises a cylindrical housing provided with a piston actuatable to move through the throughbore of the housing to a cap provided with a cylindrical sleeve. Mounted within the sleeve is a hollow valve body connected to a sealing member having an end of circular cross-section and a slidable hollow cylindrical body provided with an orifice whose cross-section is substantially equal to that of the end of the sealing member. The barrel is connected to the valve body by springs. In the valve closed position the end of the sealing member is situated in the barrel orifice, preventing the dispensing of the gelatinous material; in the valve open position the barrel is pushed away from the sealing member, allowing the material to be dispensed. The barrel returns to the valve closed position after the material has been dispensed. In use, the material is introduced into the housing; weighing the valve assembly before and after dispensing enables the quantity of dispensed material to be verified.

27 Claims, 3 Drawing Sheets

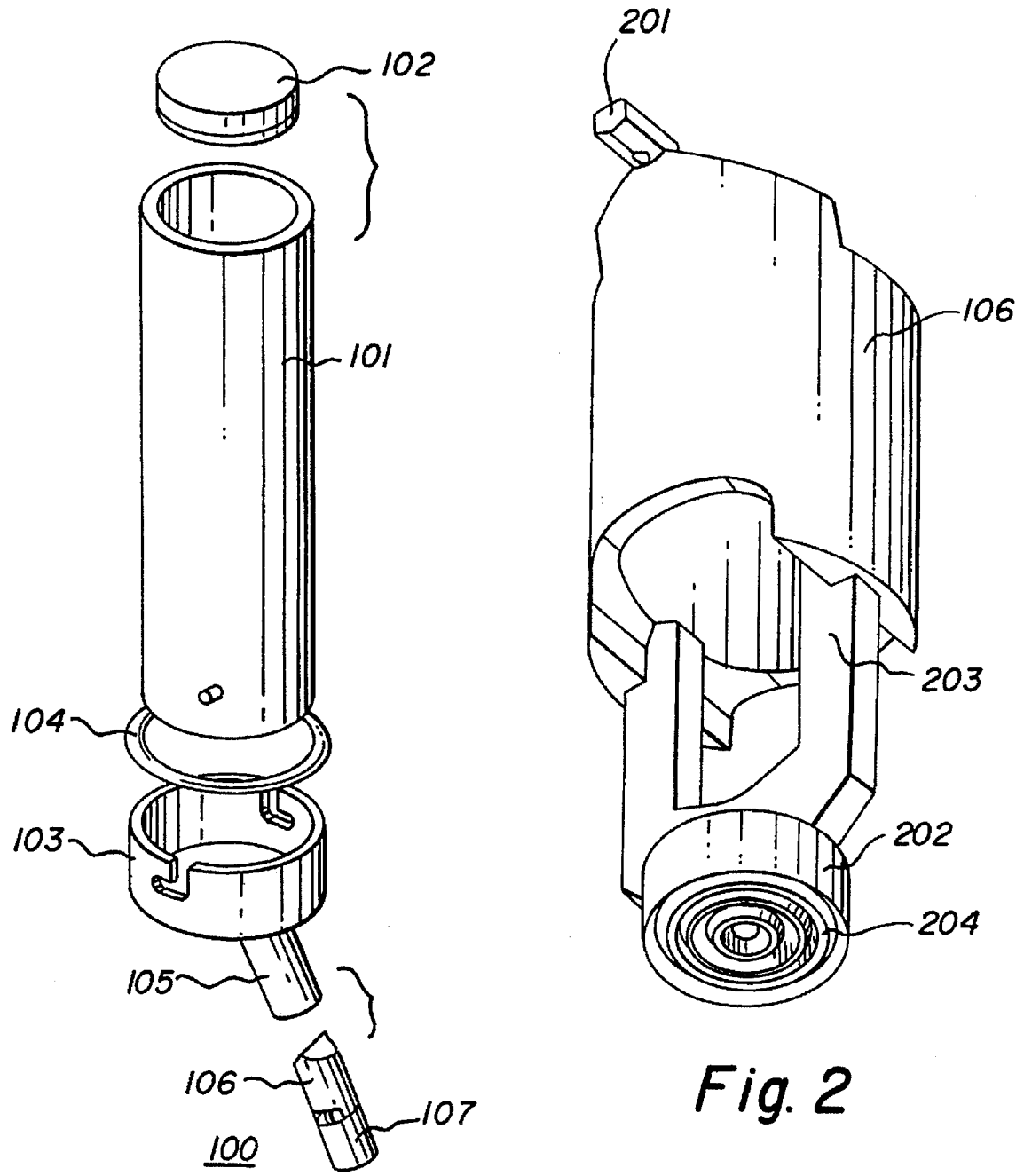

5,632,412

VALVE ASSEMBLY AND METHOD FOR DISPENSING GELATINOUS MATERIALS

FIELD OF THE INVENTION

This invention relates to delivery of material through a valve, and more particularly to a valve assembly and method for dispensing a gelatinous semisolid material into a receptacle.

BACKGROUND OF THE INVENTION

Many devices for the delivery of various materials through a valve or nozzle have been described in the art. For example, hose nozzles with constricted outlets for the spraying water from a hose are disclosed in U.S. Pat. Nos. 3,102,691 and 4,840,313. Pneumatic guns for dispensing flowable sealants and adhesives are described in U.S. Pat. Nos. 4,376,498, 5,058,769, and 5,064,098. A filler nozzle and valve with a concave-conoidal non-drip tip for delivering fluids of various viscosities is disclosed in U.S. Pat. No. 4,363,429. A nozzle assembly that includes a wire mesh screen for dripless, splashless dispensing of liquids is described in U.S. Pat. No. 5,188,289.

Valve devices for the delivery of air and other gases are also known in the art. For example, U.S. Pat. No. 2,596,909 describes a valve for admitting ventilation air in which a slidable tubular member seats against a conical plug situated in a spherical housing. Also, U.S. Pat. No. 4,721,129 discloses a pressure relief valve for gases which has a spring biased piston which operates internally of the valve to relieve pressure and is then resealed in an air-tight manner.

PROBLEM TO BE SOLVED BY THE INVENTION

In pre-production testing to develop a formulation employed in the production of photographic materials, gelatin, or addenda having gelatin as one of the ingredients, may be added to the mix contained in a receptacle such as a kettle. Such gelatin may include a dispersion of a dye or a dye-forming coupler that may itself be colored. This addition is frequently carried out by raising the temperature of the gelatin to liquefy it, then pumping it in the molten state into the kettle and metering the quantity delivered. Such a procedure requires a complex array of containers, hoses, pumps, and heaters that must be dismantled and cleaned after each use. It would be highly advantageous to dispense automatically and reproducibly a desired measured quantity of the gelatin as a semisolid gelatinous material directly into the coating mix without the need to liquefy and then pump it into the kettle. This desirable objective is met by the valve assembly and method of the present invention.

SUMMARY OF THE INVENTION

In accordance with the invention, a valve assembly for dispensing a measured quantity of a gelatinous semisolid material into a receptacle comprises:

(a) a cylindrical housing having a first end and a second end and a throughbore of circular cross-section, the housing being provided with a piston actuatable by pressure means to move through the throughbore towards the second end;

(b) a cap attached at the second end of the housing, the cap being provided with a cylindrical sleeve having a throughbore with a cross-section smaller than the cross-section of the throughbore of the housing;

(c) a hollow cylindrical valve body mounted within the throughbore of the sleeve and having an external cross-section slightly smaller than the throughbore of the sleeve, the valve body having a first end and a second end, the first end of the valve body being situated within the sleeve and being provided with retaining means for preventing ejection of the valve body from the sleeve by the pressure means;

(d) a sealing member connected to the second end of the valve body and comprising an end having a circular cross-section; and (e) a hollow cylindrical barrel mounted within the throughbore of the sleeve and having an external cross-section slightly smaller than the throughbore of the sleeve, the barrel being slidable from a valve closed position to a valve open position, the barrel having a first end and a second end and encompassing the sealing member, the first end of the barrel being situated within the throughbore of the sleeve in close proximity to the second end of the valve body, the second end of the barrel having an orifice with a cross-section substantially equal to the circular cross-section of the sealing member, the barrel being connected to the valve body by resilient means actuatable by pressure exerted by the gelatinous semisolid material;

wherein, in the valve closed position of the barrel, the sealing member is situated within the orifice of the barrel, thereby preventing the dispensing of the gelatinous semisolid material, and in the valve open position of the barrel, the orifice of the barrel is displaced away from the sealing member, thereby allowing the dispensing of the gelatinous semisolid material into the receptacle.

Also in accordance with the invention, a method for dispensing a measured quantity of a gelatinous semisolid material from a valve assembly having a known tare mass comprises:

(a) introducing a mass of the gelatinous semisolid material into a cylindrical housing included in the valve assembly, the housing having a first end and a second end and a throughbore of circular cross-section, the housing being provided with a piston that is situated in close proximity to the first end and is actuatable by pressure means to move through the throughbore towards the second end; the valve assembly further comprising: a cap attached at the second end of the housing, the cap being provided with a cylindrical sleeve having a throughbore with a cross-section smaller than the cross-section of the throughbore of the housing; a hollow cylindrical valve body mounted within the throughbore of the sleeve and having an external cross-section slightly smaller than the throughbore of the sleeve, the valve body having a first end and a second end, the first end of the valve body being situated within the sleeve and being provided with retaining means for preventing ejection of the valve body from the sleeve by the pressure means; a sealing member connected to the second end of the valve body and comprising an end having a circular cross-section; and a hollow cylindrical barrel mounted within the throughbore of the sleeve and having an external cross-section slightly smaller than the throughbore of the sleeve, the barrel being slidable from a valve closed position to a valve open position, the barrel having a first end and a second end and encompassing the sealing member, the first end of the barrel being situated within the throughbore of the sleeve in close proximity to the second end of the valve body, the second end of the barrel having an orifice with a circular cross-section substantially equal to the circular cross-section of the sealing member, the sealing member being situated within the orifice in a valve closed position, the barrel being connected to the valve body by resilient means;

(b) determining a gross mass comprising the tare mass of the valve assembly and the mass of the gelatinous semisolid material introduced into the housing;

(c) applying pressure by the pressure means to the piston to impel the piston through the throughbore of the housing to the cap, thereby forcing the gelatinous semisolid material through the sleeve and the valve body into the barrel, wherein the material exerts pressure at the orifice, thereby causing the resilient means to be compressed and the orifice to be displaced away from the sealing member to a valve open position, thereby enabling the dispensing of the measured quantity of gelatinous semisolid material from the valve assembly into the receptacle, the orifice returning to the valve closed position by the action of the resilient means after the dispensing of the measured quantity of material into the receptacle;

(d) determining an adjusted tare mass comprising the tare mass of the valve assembly together with the mass of gelatinous semisolid material remaining within the valve assembly; and (e) subtracting the adjusted tare mass from the gross mass, thereby verifying the quantity of gelatinous semisolid material that has been dispensed into the receptacle.

ADVANTAGE OF THE INVENTION

The present invention enables a measured quantity of a gelatinous semisolid material, such as a gelatin based dye dispersion, to be conveniently and reproducibly dispensed as a gelatinous semisolid into a mix contained in a kettle without the need for heaters, hoses, and pumps to liquefy the gelatin and transport it to the kettle. The valve assembly containing the gelatinous semisolid may be weighed before and after the material has been delivered to the kettle, thereby providing verification of the amount dispensed. The minimal constriction within the valve assembly allows the semisolid to be ejected by application of compressed air at relatively low pressure, and the movement of the barrel and the inclusion, in a preferred embodiment, of concentric grooves at the end of the sealing member enables the gelatinous semisolid to be dispensed without residual material remaining on the exterior of the valve assembly. After use, the assembly may be readily disassembled, cleaned, and reassembled for subsequent use.

BRIEF DESCRIPTION OF THE DRAWINGS

FIG. 1 is an exploded isometric view of the valve assembly.

FIG. 2 is an isometric view of the valve body and sealing member that shows the concentric grooves at the end of the sealing member.

DETAILED DESCRIPTION OF THE INVENTION

Figure 3:
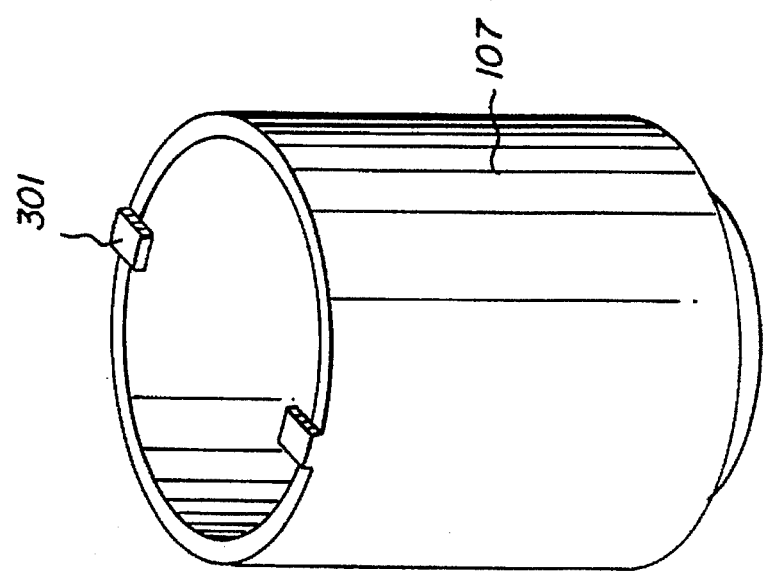
FIG. 3 is an isometric view of the barrel that shows the tabs at one end.

As depicted in FIG. 1, the valve assembly 100 for dispensing a gelatinous semisolid material into a receptacle comprises a cylindrical housing 101 provided at the first end with a piston 102 actuatable by pressure means (not shown) to move through the throughbore of the housing to a cap 103. In a preferred embodiment, as shown in FIG. 1, the cap is detachably and sealably connected to the second end of the housing, which further comprises a gasket 104, for example, an O-ring seal.

The cap is provided with a cylindrical sleeve 105 having a throughbore with a cross-section smaller than the cross-section of the housing throughbore. The sleeve may be coaxial with the cylindrical housing or, as depicted in FIG. 1, the axis of the sleeve may be canted with respect to the housing axis. Mounted within the sleeve is a hollow cylindrical valve body 106 having an external cross-section slightly smaller than the sleeve throughbore and being provided at one end with retaining means from preventing ejection of the valve body from the sleeve by the pressure means. The other end of the valve body is connected to a sealing member that comprises an end with a circular cross-section.

Also mounted within the sleeve is a hollow cylindrical barrel having an external cross-section slightly smaller than the sleeve throughbore. The barrel encompasses the sealing member and has an orifice whose cross-section is substantially equal to that of the end of the sealing member. The barrel is connected to the valve body by resilient means actuatable by pressure exerted by the gelatinous semisolid material within the valve assembly.

FIG. 2 is an isometric view of the valve body 106. Attached at one end is a lug 201, which comprises the aforementioned retaining means. The sealing member 202 is connected to the valve body at two diametrically situated points by the bifurcated shank 203. Also shown in FIG. 2 is a plurality of concentric grooves 204 at the end of the sealing member, which grooves minimize dripping of the gelatinous semisolid material.

FIG. 3 is an isometric view of the barrel 107, which is provided at one end with diametrically positioned tabs 301, to which the resilient means connecting the barrel to the valve body is attached.

Figure 4:
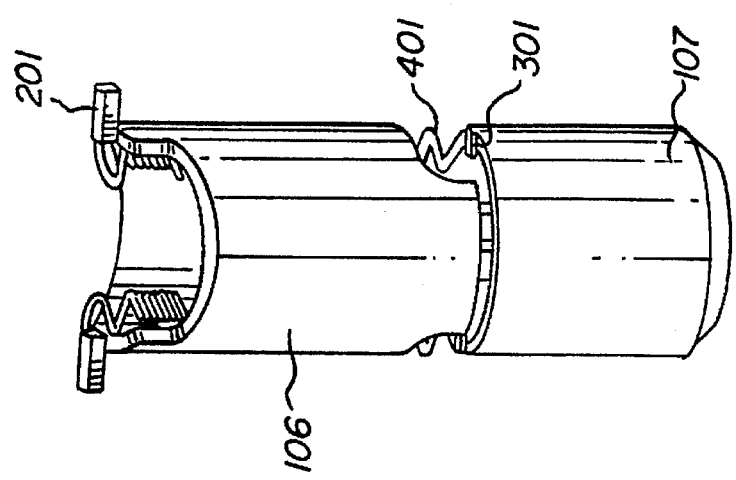
FIG. 4 is an isometric view of the valve body connected to the barrel by coil springs.

FIG. 4 is an isometric view depicting the valve body 106, the barrel 107, and coil springs 401, which comprise the resilient means connecting the valve body at lugs 201 to the barrel at tabs 301.

Figure 5:
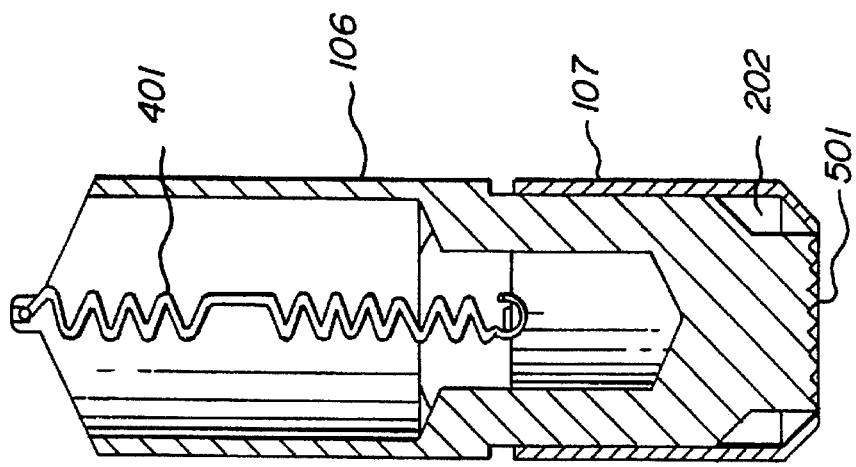
FIG. 5 is a section view showing the valve body, sealing member, and barrel in the valve closed position.
Figure 6:
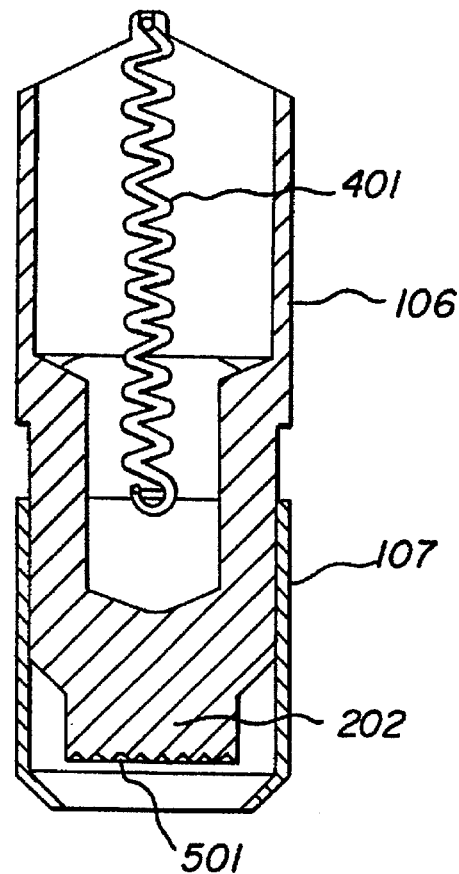
FIG. 6 is a section view showing the valve body, sealing member, and barrel in the valve open position.

FIG. 5 is a cross-section of the valve body 106 and the sealing member 202 connected by the coil spring 401 to the barrel 107; the circular grooved end of the sealing member is shown situated within the orifice 501 of the barrel in the valve closed position. The pressure of the gelatinous semisolid material at the orifice of the barrel propels the barrel away from the sealing member, the valve open position as depicted in FIG. 6, which allows the material to be forced around the sealing member and through the orifice. When the desired measured quantity of the gelatinous material has been expelled from the valve assembly, the spring relaxes and the barrel returns to the valve closed position.

As shown in FIGS. 5 and 6, in a preferred embodiment of the invention a portion of the lower, or second end of the barrel is frusto-conically tapered, thereby defining the circumference of the orifice, whose circular cross-section is substantially equal to the cross-section of the sealing member. The preferred angle of the taper, as measured from the end of the sealing member, is about 45 degrees. The tapered inner surface of the barrel at the orifice causes the gelatinous semisolid material to be dispensed in a narrow conical flow path.

Figure 7:
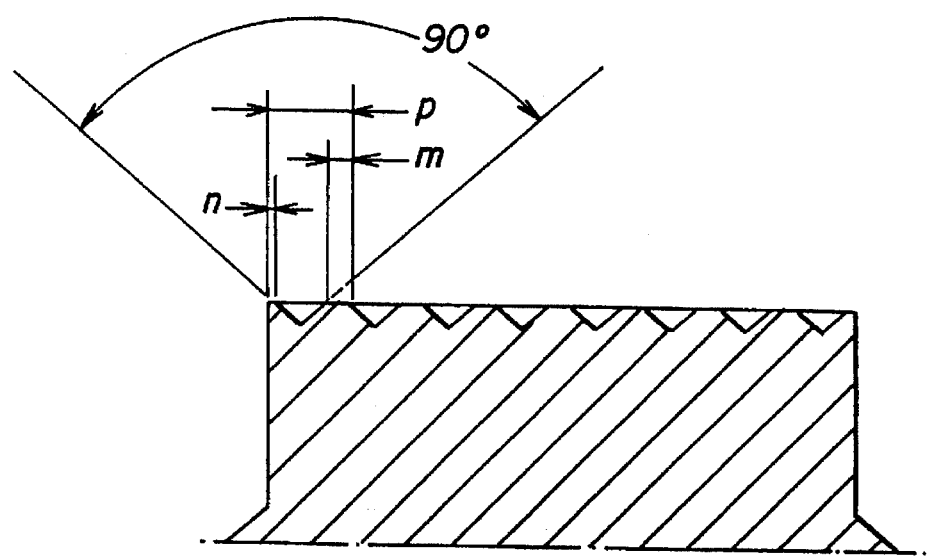
FIG. 7 is a section view showing the concentric grooves on the end of the sealing member.

As previously described, the circular end of the sealing member comprises a plurality of concentric grooves to minimize dripping of the gelatinous material. FIG. 7 is a cross-section depicting the detail of the grooves, whose walls are disposed at an angle of about 90° to each other. The circular grooves are characterized by pitch whose width is represented by p, inner top lands whose width is represented by m, and an outermost top land whose width is represented by n. In a preferred embodiment, the ratio of pitch width to inner top land width, p:m, and the ratio of inner top land width to outermost top land width, m:n, are each from 3:1 to 5:1. In a more preferred embodiment, the ratio of pitch width to inner top land width, p:m, and the ratio of inner top land width to outermost top land width, m:n, are each from 3.5:1 to 4.5:1. In the most preferred embodiment, the ratio of pitch width to inner top land width, p:m, and the ratio of inner top land width and outermost top land width, m:n, are each 4:1.

In operation, the cylindrical housing of the valve assembly is filled with a known quantity of a gelatinous semisolid material. As previously described, this gelatinous semisolid may be gelatin used in the production of photographic materials and may further comprise a dispersion of a dye or a dye-forming coupler that may itself be colored. The piston is placed in the cylinder atop the gelatinous semisolid. A shaft actuatable by, for example, manual means such as a crank or a lever, by a linear motor, by hydraulic pressure or, preferably, by compressed air drives the piston through the throughbore to the cap. The minimal constriction within the valve assembly enables a desired measured quantity of gelatinous material to be ejected at relatively low air pressure. The gelatinous semisolid material is forced through the sleeve into the valve body and the barrel. The pressure of the semisolid material at the orifice of the barrel causes the coil spring resilient means connecting the barrel to the valve body to extend, enabling the barrel to move from the valve closed position to the valve open position, resulting in the reproducible dispensing of the desired quantity of gelatinous material into the receptacle. After the desired quantity of material has been ejected from the valve assembly, the spring resilient means relaxes and the barrel returns to the valve closed position. The grooves at the end of the sealing member discourage adherence of the gelatinous material to the end of the sealing member, thereby minimizing dripping. This discouraged adherence also promotes reproducibility in the amount dispersed. That is, since the amount of material adhering to the valve may be different for each usage, the dispersing precision would be impaired. If no material adheres, this variability in the system is reduced, thereby improving the precision.

The tare mass of the valve assembly can be determined prior to introduction of a quantity of semisolid material by means known to those skilled in the art, such as a scale or balance. A gross mass comprising the tare mass and the mass of the semisolid material contained in the housing can similarly be determined by such known means. Following the dispensing of the material into the receptacle, an adjusted tare mass comprising the tare mass and any residual gelatinous material remaining within the valve assembly can be ascertained. The difference between the adjusted tare mass and the gross mass can then be determined to verify that the desired measured quantity of gelatinous semisolid material has been dispensed into the receptacle. That is: Semisolid Material Mass=Gross Mass−Tare Mass. Following use, the valve assembly can be readily disassembled, cleaned, and reassembled for subsequent use.

The invention has been described in detail with particular reference to preferred embodiments thereof, but it will be understood that variations and modifications can be effected within the spirit and scope of the invention.

PARTS LIST 100 valve assembly
101 housing
102 piston
103 cap
104 gasket
105 sleeve
106 valve body
107 barrel
201 lug
202 sealing member
203 bifurcated shank
204 concentric grooves
301 tab
401 Coil spring
501 orifice

What is claimed is:

1. A valve assembly for dispensing a measured quantity of a gelatinous semisolid material into a receptacle, which comprises:

(a) a cylindrical housing having a first end and a second end and a throughbore of circular cross-section, said housing being provided with a piston actuatable by pressure means to move through said throughbore towards said second end;

(b) a cap attached at said second end of said housing, said cap being provided with a cylindrical sleeve having a throughbore with a cross-section smaller than said cross-section of said throughbore of said housing;

(c) a hollow cylindrical valve body mounted within said throughbore of said sleeve and having an external cross-section smaller than said throughbore of said sleeve, said valve body having a first end and a second end, said first end of said valve body being situated within said sleeve and being provided with retaining means for preventing ejection of said valve body from said sleeve by said pressure means;

(d) a sealing member connected to said second end of said valve body and comprising an end having a circular cross-section; and (e) a hollow cylindrical barrel mounted within said throughbore of said sleeve and having an external cross-section smaller than said throughbore of said sleeve, said barrel being slidable from a valve closed position to a valve open position, said barrel having a first end and a second end and encompassing said sealing member, said first end of said barrel being situated within said throughbore of said sleeve in close proximity to said second end of said valve body, said second end of said barrel having an orifice with a cross-section substantially equal to said circular cross-section of said sealing member, said barrel being connected to said valve body by resilient means actuatable by pressure exerted by said gelatinous semisolid material;

wherein, in said valve closed position of said barrel, said sealing member is situated within said orifice of said barrel, thereby preventing the dispensing of said gelatinous semisolid material, and in said valve open position of said barrel, said orifice of said barrel is displaced away from said sealing member, thereby allowing the dispensing of said gelatinous semisolid material into said receptacle.

2. A valve assembly according to claim 1 wherein said gelatinous semisolid material comprises gelatin.

3. A valve assembly according to claim 2 wherein said gelatinous semisolid material further comprises a dispersion of a dye or a dye-forming coupler compound.

4. A valve assembly according to claim 1 wherein said pressure means comprises a shaft actuatable by compressed air.

5. A valve assembly according to claim 1 wherein said retaining means comprises at least one lug attached at said first end of said valve body.

6. A valve assembly according to claim 5 wherein said barrel further comprises at least one tab attached at said first end of said barrel.

7. A valve assembly according to claim 6 wherein said resilient means comprises at least one coil spring.

8. A valve assembly according to claim 7 wherein said coil spring has a first end that is connected to said lug attached to said valve body and a second end that is connected to said tab attached to said barrel.

9. A valve assembly according to claim 1 wherein a portion of said cylindrical barrel at said second end of said barrel is frusto-conically tapered at an angle of taper measured from said end of said sealing member, said tapered portion defining the circumference of said orifice of said barrel.

10. A valve assembly according to claim 9 wherein said angle of taper comprises about 45 degrees.

11. A valve assembly according to claim 1 wherein said sealing member is connected to said valve body at two diametrically situated points on said valve body by a bifurcated shank.

12. A valve assembly according to claim 11 wherein said end of said sealing member comprises a plurality of concentric grooves to prevent dripping of said gelatinous semisolid material.

13. A valve assembly according to claim 11 wherein said plurality of concentric grooves is characterized by a pitch width, an inner top land width, and an outermost top land width, and the ratio of pitch width to inner top land width, and the ratio of inner top land width to outermost top land width are each from 3:1 to 5:1.

14. A valve assembly according to claim 13 wherein said ratio of pitch width to inner top land width and said ratio of inner top land width to outermost top land width and said ratio of inner top land width to outermost top land width are each from 3.5:1 to 4.5:1.

15. A valve assembly according to claim 14 wherein said ratio of pitch width to inner top land width and said ratio of inner top land width to outermost top land width are each 4:1.

16. A valve assembly according to claim 1 wherein said cap is detachably and sealably connected to said second end of said housing, said second end of said housing further comprising a gasket.

17. A valve assembly for dispensing a measured quantity of a gelatinous semisolid material into a receptacle, which comprises:

(a) a cylindrical housing having a first end and a second end and a throughbore of circular cross-section, said housing being provided with a piston that is driven by a shaft actuatable by compressed air to move through said throughbore towards said second end;

(b) a cap detachably and sealably attached at said second end of said housing, said cap being provided with a cylindrical sleeve having a throughbore with a cross-section smaller than said cross-section of said throughbore of said housing;

(c) a hollow cylindrical valve body mounted within said throughbore of said sleeve and having an external cross-section smaller than said throughbore of said sleeve, said valve body having a first end and a second end, said first end of said valve body being situated within said sleeve and being provided with two diametrically situated lugs for preventing ejection of said valve body from said sleeve by said compressed air;

(d) a sealing member connected to said second end of said valve body by a bifurcated shank, said sealing member having a circular cross-section and an end that comprises a plurality of concentric grooves; and (e) a hollow cylindrical barrel mounted within said throughbore of said sleeve and having an external cross-section smaller than said throughbore of said sleeve, said barrel being slidable from a valve closed position to a valve open position, said barrel having a first end and a second end and encompassing said sealing member, said first end of said barrel being provided with two diametrically positioned tabs and being situated within said throughbore of said sleeve in close proximity to said second end of said valve body, a portion of said barrel at said second end of said barrel being tapered at an angle of taper of about 45 degrees measured from said end of said sealing member, said tapered portion defining an orifice with a cross-section substantially equal to said circular cross-section of said sealing member, each of said tabs on said barrel being connected to one of said lugs on said valve body by one of two coil springs;

wherein, in said valve closed position of said barrel, said sealing member is situated within said orifice of said barrel, thereby preventing the dispensing of said gelatinous semisolid material, and in said valve open position of said barrel, said orifice of said barrel is displaced away from said sealing member, thereby allowing the dispensing of said gelatinous semisolid material into said receptacle.

18. A method for dispensing a measured quantity of a gelatinous semisolid material from a valve assembly having a known tare mass, which comprises:

(a) introducing a mass of said gelatinous semisolid material into a cylindrical housing included in said valve assembly, said housing having a first end and a second end and a throughbore of circular cross-section, said housing being provided with a piston that is situated in close proximity to said first end and is actuatable by pressure means to move through said throughbore towards said second end; said valve assembly further comprising: a cap attached at said second end of said housing, said cap being provided with a cylindrical sleeve having a throughbore with a cross-section smaller than said cross-section of said throughbore of said housing; a hollow cylindrical valve body mounted within said throughbore of said sleeve and having an external cross-section smaller than said throughbore of said sleeve, said valve body having a first end and a second end, said first end of said valve body being situated within said sleeve and being provided with retaining means for preventing ejection of said valve body from said sleeve by said pressure means; a sealing member connected to said second end of said valve body and comprising an end having a circular cross-section; and a hollow cylindrical barrel mounted within said throughbore of said sleeve and having an external cross-section smaller than said throughbore of said sleeve, said barrel being slidable from a valve closed position to a valve open position, said barrel having a first end and a second end and encompassing said sealing member, said first end of said barrel being situated within said throughbore of said sleeve in close proximity to said second end of said valve body, said second end of said barrel having an orifice with a circular cross-section substantially equal to said circular cross-section of said sealing member, said sealing member being situated within said orifice in a valve closed position, said barrel being connected to said valve body by resilient means;

(b) determining a gross mass comprising said tare mass of said valve assembly and said mass of said gelatinous semisolid material introduced into said housing;

(c) applying pressure by said pressure means to said piston to impel said piston through said throughbore of said housing to said cap, thereby forcing said gelatinous semisolid material through said sleeve and said valve body into said barrel, wherein said material exerts pressure at said orifice, thereby causing said resilient means to be compressed and said orifice to be displaced away from said sealing member to a valve open position, thereby enabling the dispensing of the measured quantity of gelatinous semisolid material from said valve assembly into said receptacle, said orifice returning to said valve closed position by said action of said resilient means after the dispensing of the measured quantity of material into said receptacle;

(d) determining an adjusted tare mass comprising said tare mass of said valve assembly together with said mass of gelatinous semisolid material remaining within said valve assembly; and (e) subtracting said adjusted tare mass from said gross mass, thereby verifying the quantity of gelatinous semisolid material that has been dispensed into said receptacle.

19. A method according to claim 18 wherein said gelatinous semisolid material comprises gelatin.

20. A method according to claim 19 wherein said gelatinous semisolid material further comprises a dispersion of a dye or a dye-forming coupler.

21. A method according to claim 18 wherein said pressure means comprises a shaft actuatable by compressed air.

22. A method according to claim 18 wherein said retaining means comprises at least one lug attached at said first end of said valve body, said resilient means comprises at least one coil spring, and said barrel further comprises at least one tab attached at said first end of said barrel.

23. A method according to claim 22 wherein said coil spring has a first end and that is connected to said lug attached to said valve body and a second end that is connected to said tab attached to said barrel.

24. A method according to claim 18 wherein a portion of said cylindrical barrel at said second end of said barrel is frusto-conically tapered at an angle of 45° measured from said end of said sealing member, said tapered portion thereby defining said orifice of said barrel.

25. A method according to claim 18 wherein said sealing member is connected to said valve body at two diametrically situated points on said valve body by a bifurcated shank and wherein said end of said sealing member comprises a plurality of concentric grooves to prevent dripping of said gelatinous semisolid material.

26. A method according to claim 18 wherein said cap is detachably and sealably connected to said second end of said housing and wherein said second end of said housing further comprises a gasket.

27. A method for dispensing a measured quantity of a gelatinous semisolid material from a valve assembly having a known tare mass, which comprises:

(a) introducing a mass of said gelatinous semisolid material into a cylindrical housing included in said valve assembly, said housing having a first end and a second end and a throughbore of circular cross-section, said housing being provided with a piston that is situated in close proximity to said first end and is driven by a shaft actuatable by compressed air to move through said throughbore towards said second end; said valve assembly further comprising: a cap detachably and sealably attached at said second end of said housing, said cap being provided with a cylindrical sleeve having a throughbore with a cross-section smaller than said cross-section of said throughbore of said housing; a hollow cylindrical valve body mounted within said throughbore of said sleeve and having an external cross-section smaller than said throughbore of said sleeve, said valve body having a first end and a second end, said first end of said valve body being situated within said sleeve and being provided with two diametrically situated lugs for preventing ejection of said valve body from said sleeve by said compressed air; a sealing member connected to said second end of said valve body by a bifurcated shank and comprising an end that has a circular cross-section and comprises a plurality of concentric grooves; and a hollow cylindrical barrel mounted within said throughbore said sleeve and having an external cross-section smaller than said throughbore of said sleeve, said barrel being slidable from a valve closed position to a valve open position, said barrel having a first end and a second end and encompassing said sealing member, said first end of said barrel being situated within said throughbore of said sleeve in close proximity to said second end of said valve body, a portion of said barrel at said second end of said barrel being tapered at an angle of taper of about 45 degrees measured from said end of said sealing member, said tapered portion defining an orifice with a circular cross-section substantially equal to said circular cross-section of said sealing member, said sealing member being situated within said orifice in a valve closed position, each of said tabs on said barrel being connected to one of said lugs on said valve body by one of two coil springs;

(b) determining a gross mass comprising said tare mass of said valve assembly and said mass of said gelatinous semisolid material introduced into said housing;

(c) applying pressure by said shaft actuatable by compressed air to said piston to impel said piston through said throughbore of said housing to said cap, thereby forcing said gelatinous semisolid material through said sleeve and said valve body into said barrel, wherein said material exerts pressure at said orifice, thereby causing said springs to be compressed and said orifice to be displaced away from said sealing member to a valve open position, thereby enabling the dispensing of the measured quantity of gelatinous semisolid material from said valve assembly into said receptacle, said orifice returning to said valve closed position after the dispensing of the measured quantity of material into said receptacle;

(d) determining an adjusted tare mass comprising said tare mass of said valve assembly together with said mass of gelatinous semisolid material remaining within said valve assembly; and (e) subtracting said adjusted tare mass from said gross mass, thereby verifying the quantity of gelatinous semisolid material that has been dispensed into said receptacle.

* * * * *